(12) United States Patent
Marelas (10) Patent No.: US 10,649,974 B1
(45) Date of Patent: *May 12, 2020

(54) USER-LEVEL PROCESSES IN A SHARED MULTI-TENANT DE-DUPLICATION SYSTEM

(71) Applicant: EMC IP Holding Company LLC, Hopkinton, MA (US)

(72) Inventor: Peter Marelas, Melbourne (AU)

(73) Assignee: EMC IP HOLDING COMPANY, Hopkinton, MA (US)

( * ) Notice: Subject to any disclaimer, the term of this patent is extended or adjusted under 35 U.S.C. 154(b) by 565 days.

This patent is subject to a terminal disclaimer.

(21) Appl. No.: 14/870,565

(22) Filed: Sep. 30, 2015

(51) Int. Cl.
*G06F 16/23* (2019.01)
*G06F 16/28* (2019.01)
*G06F 16/22* (2019.01)

(52) U.S. Cl.
CPC ...... *G06F 16/2365* (2019.01); *G06F 16/2255* (2019.01); *G06F 16/285* (2019.01)

(58) Field of Classification Search
CPC .................. G06F 17/30371; G06F 17/3033
See application file for complete search history.

(56) References Cited

U.S. PATENT DOCUMENTS

| | | | | |
|---|---|---|---|---|
| 7,387,240 B2* | 6/2008 | Ziegler | ............. | G06Q 20/3552 235/379 |
| 8,751,804 B1* | 6/2014 | Nystrom | ............. | H04L 63/0428 713/168 |
| 9,355,259 B1* | 5/2016 | Choo | .................... | G06F 21/602 |
| 2011/0055471 A1 | 3/2011 | Thatcher | | |
| 2011/0099351 A1 | 4/2011 | Condict | | |
| 2011/0283110 A1* | 11/2011 | Dapkus | ................. | G06F 21/577 713/182 |
| 2012/0278633 A1* | 11/2012 | Frieder | ............... | G06F 21/6245 713/189 |
| 2013/0111196 A1* | 5/2013 | Pasam | ................... | G06F 21/575 713/1 |
| 2014/0005809 A1* | 1/2014 | Frei | ..................... | H04L 29/1249 700/90 |
| 2014/0013112 A1* | 1/2014 | Cidon | ................. | G06F 21/6218 713/165 |
| 2014/0281535 A1* | 9/2014 | Kane | ................... | H04L 63/0428 713/168 |
| 2014/0281574 A1* | 9/2014 | Webb | ..................... | G06F 21/74 713/189 |
| 2015/0127607 A1* | 5/2015 | Savage | ............. | G06F 17/30194 707/610 |

(Continued)

OTHER PUBLICATIONS

U.S. Appl. No. 14/870,407, filed Sep. 30, 2015, Peter Marelas.
U.S. Appl. No. 14/870,407, Jan. 11, 2018, Office Action.
U.S. Appl. No. 14/870,407, Aug. 10, 2018, Final Office Action.

*Primary Examiner* — Alicia M Willoughby
(74) *Attorney, Agent, or Firm* — Workman Nydegger (57) ABSTRACT

In one example, a method for managing data includes detecting, in a shared multi-tenant deduplication system, a data stream that is specific to a particular user and that includes one or more user objects each having one or more data chunks. The data associated with the user is salted by associating a user-specific salt with the data chunks of the one or more user objects to form user-specific combinations of the form ((user-specific salt)+(user data chunk)). Finally, the user data is processed using the user-specific salt.

20 Claims, 6 Drawing Sheets (56) References Cited

U.S. PATENT DOCUMENTS

| | | |
|---|---|---|
| 2015/0227757 A1 | 8/2015 | Bestler |
| 2015/0324590 A1* | 11/2015 | Krten ..................... G06F 21/14 726/26 |
| 2015/0326390 A1* | 11/2015 | Kim ..................... H04L 9/0863 380/44 |
| 2015/0371052 A1* | 12/2015 | Lepeshenkov .......... H04L 63/06 713/165 |
| 2016/0004716 A1* | 1/2016 | Akirav .............. G06F 17/30156 707/692 |
| 2016/0054949 A1 | 2/2016 | Obame Meye |
| 2016/0086260 A1* | 3/2016 | Vermeulen ............. G06Q 40/00 705/35 |
| 2016/0154839 A1* | 6/2016 | Bezawada ......... G06F 17/30371 707/692 |

* cited by examiner

USER-LEVEL PROCESSES IN A SHARED MULTI-TENANT DE-DUPLICATION SYSTEM

RELATED APPLICATIONS

This application is related to U.S. patent application Ser. No. 14/870,407, entitled FINE-GRAINED SHARED MULTI-TENANT DE-DUPLICATION SYSTEM, filed the same day herewith. The aforementioned application is incorporated herein in its entirety by this reference.

FIELD OF THE INVENTION

Embodiments of the present invention generally concern data backup and restoration. More particularly, at least some embodiments of the invention relate to systems, hardware, computer-readable media, and methods directed to identification, on a user basis, of user consumption of services, such as deduplication services.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. In particular, many companies today find their backup and recovery process strained as data growth in enterprise IT environment continues to accelerate at exponential rates, while data-protection solutions have struggled to keep pace. Backup performance is crippled by the needs of up-to-date and online business applications.

In challenging environments such as these, attention has turned to deduplication solutions that can use storage space more efficiently by avoiding the storage of duplicate data. Many deduplication systems are global in scope, in that they identify and eliminate duplicate data across multiple users in a domain. That is, global deduplication systems are shared among multiple users, and are configured and operate to treat all data sets equally. In this way, an enterprise is able to take advantage of commonality among the various user data sets.

However, with the increasing popularity of Information Technology as a Service (ITaaS) models, enterprises are increasingly being asked to attribute the cost of IT services to end users, that is, consumers. To achieve this for global deduplication systems, IT services must offer show back capabilities that attribute consumption of deduplication services to the data of an individual user. The show back capabilities, in turn, enable charge back, that the ability to bill the user based on their indicated use of deduplication services. However, implementation of effective and accurate show back and charge back functions has not been achieved in typical deduplication systems. This is due at least in part to the fact that global deduplication systems and services are not designed to distinguish between different users in this way. Thus, while attempts have been made to adapt global deduplication to provide show back and charge back capabilities, such attempts have been largely unsuccessful.

Nonetheless, the need to be able to attribute deduplication costs to users, and the need to recover those costs, persist. Thus, many enterprises and service providers have resorted to show back models that rely on measuring the pre-compressed capacity consumed by the user objects. These metrics are recorded in the file system namespace which can be processed quickly and efficiently. While this approach is relatively easy to implement and administer, it is unable to quantify the effectiveness of the deduplication system relative to the objects of an individual user. Rather, all users are treated equally with respect to the effectiveness, or lack thereof, of the data reduction techniques. That is, the value provided by the deduplication system to any given user cannot be readily determined. Thus, while the value provided by the deduplication system can vary from one user to another user, all the users are treated as having received the same value. One result of this is that users who receive relatively less value effectively subsidize the users to whom relatively more value is provided.

As well, at least some deduplication systems are vulnerable to exploitation by users. For example, many users recognize that by pre-compressing data before sending the data to the deduplication system, they are able to reduce the amount of logical capacity consumed, which substantially reduces the users show back measure and, accordingly, the cost charged to the user. For the IT service provider, this is detrimental to the economics of the deduplication system and the show back cost model, which assumes an average level of deduplication for each of a plurality of users.

In light of problems and shortcomings such as those noted above, it would be useful to be able to measure, on a user basis, backend storage consumption for objects quickly and efficiently for a large number of users and for any low-end or high-end deduplication system. Correspondingly, it would be useful to be able to accurately attribute and bill, on a user basis, consumption of deduplication services. As well, it would be useful to be able to implement a deduplication system that is not easily exploited by users.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

At least some embodiments of the invention relate to systems, hardware, computer-readable media, and methods directed to identification, on a user basis, of user consumption of services, such as deduplication services in which user data may be deduplicated before, or after, being backed up. The deduplicated backup data can later be retrieved and restored to one or more targets.

It should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

In at least some implementations, user level content salting is employed in which each user is assigned a unique system-wide marker, which may be referred to herein as a salt, that persists as long as the user exists in the system. Each time that user connects to the system, the salt assigned to that user is obtained and the salt is then associated with any data generated by that user. Data generated by, or at the direction of, a user may be referred to herein as taking the form of chunks of data. However, it should be understood that the scope of the invention is not limited to any particular type, combination or size of data.

With regard to one particular embodiment, data generated by the user are appended, or prepended, as the case may be, with the salt that has been assigned to that user. Once the salt has been associated with the user data, the combination of the user data and the salt is used to generate a hash. Because this hash includes the user specific salt, the hash of the data+salt combination is also specific to that user. The salt can then be recorded both against the namespace of the user object that includes the data that was hashed, and against the hash itself.

In operation, any common chunk or other piece of user data that is generated in a subsequent stream by the same user will compute the same hash with the same content salt. Thus, duplicate data can be readily identified by comparing a new hash with existing hashes for the same user and, where the new and existing hashes match, the data that served as the basis for the new hash can be eliminated. Because deduplication is performed at the user level in the deduplication environment or domain, it is possible, for example, that two different users may store identical blocks of data, although the content salts of the respective users ensures that the two identical blocks will not share the same persistent storage address space.

Advantageously then, embodiments of the invention provide the ability to perform user-specific deduplication in a deduplication environment. That is, embodiments of the invention enable the creation of user-level deduplication domains within a deduplication environment that is shared by multiple users. As well, this deduplication can be performed at any desired granularity, one example of which is the user object level. Moreover, the deduplication can be performed locally at the user, so that duplicates are eliminated before the data is transferred across a cloud connection for backup. Finally, in some embodiments, a hybrid approach can be employed in which both user-level deduplication and global deduplication can be performed in the same deduplication environment. The user-level deduplication can be directed to one type or set of user data, while the global deduplication can be directed to a second type or set of user data.

A. Example Operating Environments

In general, embodiments of the invention may include and/or be implemented in an operating environment that includes one or more clients that include data that is desired to be protected in some way. The clients can communicate with a backup server and may include one or more applications which generate, and/or cause the generation of, data which is desired to be backed up for later restoration to the client and/or one or more other target machines. The clients and the target machines can be physical machines or virtual machines (VM), though neither type of machine is required for any embodiment. As used herein, the term 'data' is intended to be broad in scope and embraces, by way of example and not limitation, data chunks, data blocks, atomic data, emails, objects of any type, files, contacts, directories, volumes, and any group of one or more of the foregoing.

Figure 1:
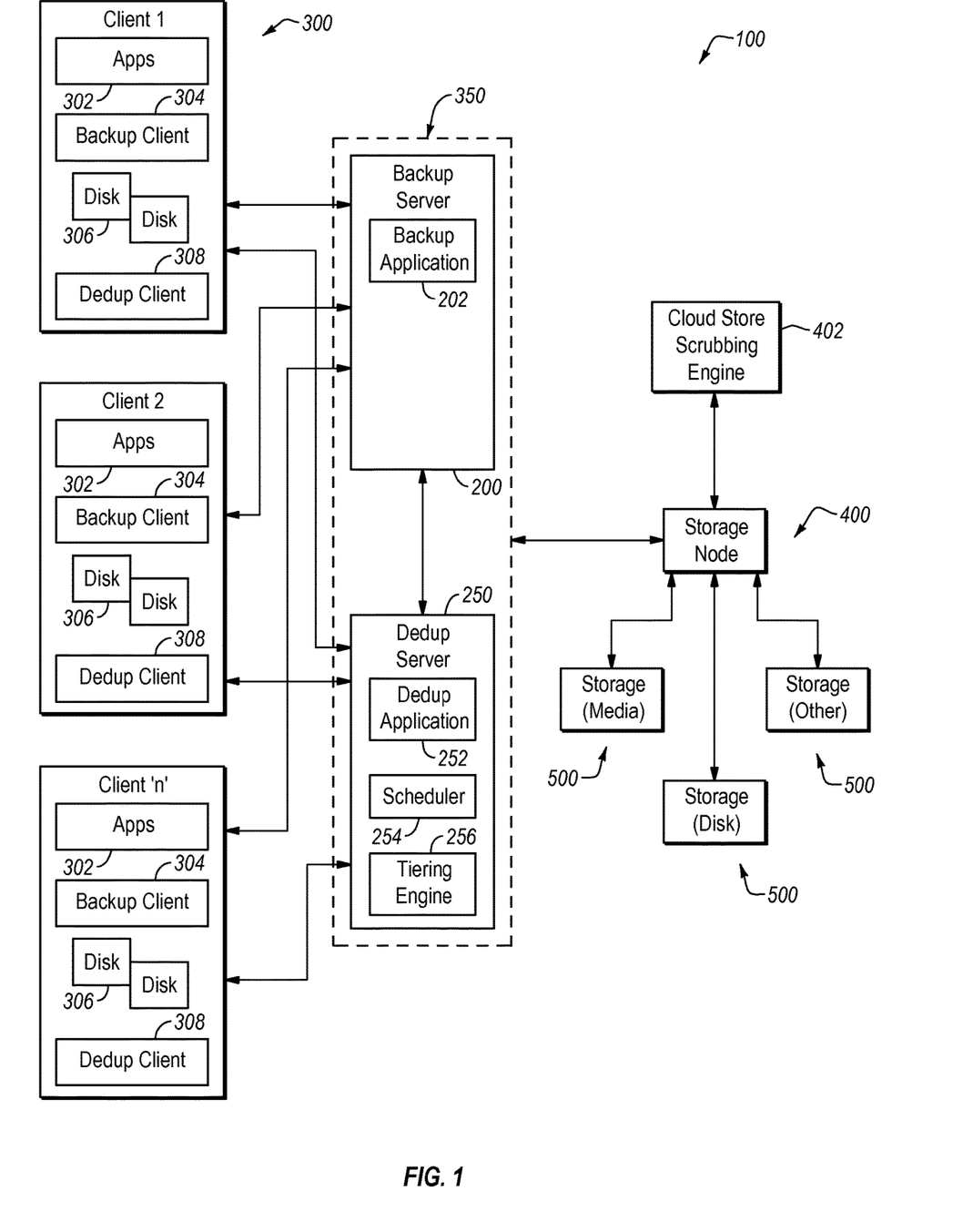
FIG. 1 discloses aspects of various example operating environments for at least some embodiments.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computing devices that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with a deduplication server 250, one or more clients 300, and a storage node 400 that may comprise an element of a cloud computing environment. The deduplication server 250 and backup server 200 may collectively define a deduplication environment 350 although, as noted herein, the deduplication environment 350 can take other forms as well. The deduplication environment 350 may reside at the same physical premises as one or more of the clients 300, although that is not required. It should be noted that, more generally, the deduplication environment refers to any environment in which deduplication is performed and, as such, the scope of the invention is not limited to the example of FIG. 1.

In some embodiments, the respective functionalities of the deduplication server 250 and backup server 200 may be combined in a single server. In yet other environments, the deduplication server 250 is omitted and respective instances of a deduplication application 252 reside on one or more of the clients 300, each of which communicates with the backup server 200. In this example, the deduplication environment 350 comprises the group of clients 300 on which the deduplication application 252 resides. The deduplication server 250 may further include a scheduler and a tiering engine 256.

The storage node 400, which may be a cloud storage node, can communicate with, or include, various types of storage 500, and the storage node 400 may include or be associated with a cloud store scrubbing engine 402. In general, backups of one or more of the clients 300 can be made by cooperation between the backup server 200 and the client 300, and the backups can then be stored by the backup server 200 at the storage node 400. Subsequently, one or more of the stored backups can be restored to one or more of the clients 300 and/or any other target(s). The backup server 200, deduplication server 250, clients 300, storage node 400 and/or target(s) may be physical machines, virtual machines (VM), containerized machines, or any other suitable type of device. As well, some or all of the storage 500 can be implemented as physical or virtual devices. Finally, while not specifically illustrated, the storage node 400 can include one or more database servers that communicate with one or more data stores. The database servers can store metadata, such as pointers for example, that point to data stored in the data store(s).

In one alternative to the arrangement of FIG. 1, the storage node 400 can be replaced with, or constitute, a primary storage device that communicates with the backup server 200. The primary storage device, in turn, may communicate with a data domain, which may incorporate the EMC Corp. DataDomain backup technology, that includes one or more storage devices where backups can be retrievably stored. The storage devices of the data domain can include, for example, an onsite retention storage device or array, and also an offsite disaster recovery (DR) storage device or array.

With particular reference first to the backup server 200, some embodiments may employ a backup server 200 in the form of an EMC Avamar server or NetWorker server, although the scope of the invention is not limited to those example servers. The backup server 200 includes a backup application 202 that participates in the generation of backups. Example implementations of the backup application 202 are discussed in more detail below.

One or more of the nodes, such as client 300, with which the backup server 200 communicates can take the form of a server. It is not required that the server be any particular type of server. One or more of the client(s) 300 include any of various applications 302 that generate data that is desired to be protected. As well, the client(s) 300 can each include a respective instance of a backup client 304 that generally operates in cooperation with the backup application 202 of the backup server 200 to create one or more backups that include data that is resident on storage media 306, such as disks for example, of the client 300. The backups thus created can be communicated to the storage node 400 for storage and subsequent retrieval.

Example embodiments can be employed in a variety of different devices and applications, examples of which the following EMC products related to backup and deduplication devices, namely, EMC Data Domain, EMC Avamar, and EMC CloudBoost. However, the scope of the invention is not limited to backup devices and, accordingly, yet other embodiments can be employed in storage devices such as EMC XtremIO, EMC VNX, EMC VMAX, EMC Isilon, EMC Atmos, and EMC Elastic Cloud Storage. Finally, embodiments of the invention can be applied to any storage medium, examples of which include, but are not limited to, memory, flash, hard disk and tape.

B. Example Deduplication Domain

With continued reference to the example operating environment of FIG. 1, a the deduplication environment 350 may, as noted earlier, include the backup server 200 and deduplication server 250. In general, the deduplication environment 350 is configured to communicate with a cloud storage environment which includes, or may consist of, the storage node 400. As such, deduplicated backups, which may be user-specific deduplicated backups, can be communicated by the deduplication environment 350 to the storage node 400.

In general, the deduplication server 250 includes a deduplication application 252 that cooperates with respective deduplication clients 308 on one or more of the clients 300 to perform deduplication services with respect to client 300 data that is to be backed up. Creation of the backup and deduplication can be performed in any order. Thus, creation of the backup may be performed before, after, or at substantially the same time as, deduplication of the data that is to be backed up.

Thus, in some embodiments, deduplication is cooperatively performed by the deduplication application 252 and the deduplication clients 308 after data has been identified for backup. Once deduplication has been completed, the backup application 202 can then cooperate with the backup clients 304 to create a backup of the deduplicated data. The deduplicated backup(s) can then be communicated to the storage node 400.

In one alternative embodiment, the backup may first be created by cooperation of the backup application 202 and backup clients 304 and, subsequently, deduplication can be performed on that backup by cooperation of the deduplication application 252 and deduplication clients 308. The deduplicated backup(s) can then be communicated to the storage node 400.

C. Example Host Configuration

Figure 2:
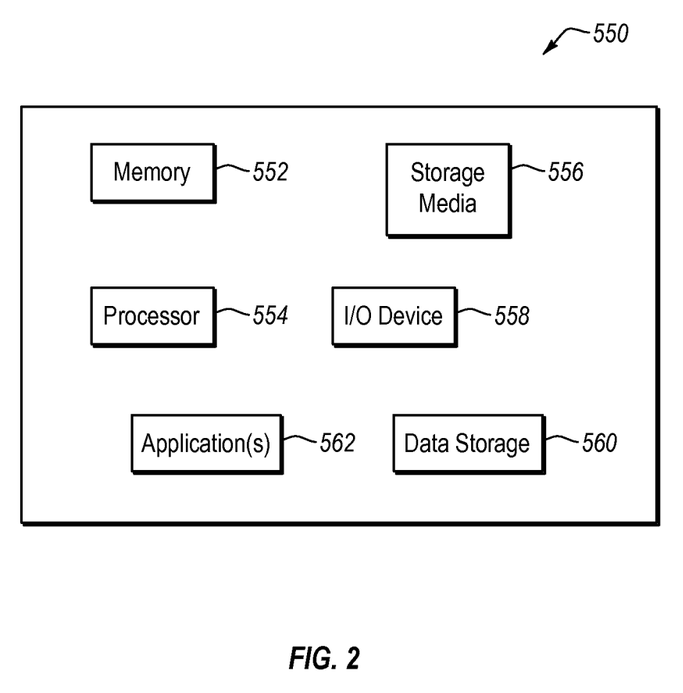
FIG. 2 discloses aspects of an example host configuration.

With reference briefly to FIG. 2, one or more of the backup server 200, deduplication server 250, clients 300, or storage node 400 can take the form of a physical computing device, one example of which is denoted at 550. In the example of FIG. 2, the computing device 550 includes a memory 552, one or more hardware processors 554, non-transitory storage media 556, I/O device 558, and data storage 560. As well, one or more applications 562 are provided that comprise executable instructions. Such executable instructions can take the form, for example, of one or more of a backup application, a backup client, or a deduplication application.

D. Aspects of Some Example Methods

With reference now to FIGS. 3-7, aspects of a variety of example methods are disclosed. In general, these methods are concerned with various uses and applications relating to salted content, examples of which are disclosed in detail in the 'Related Application' Ser. No. 14/870,407 identified at the beginning of this application and incorporated herein. Among other things, one, some, or all, of these methods can be performed in a shared deduplication environment. As such, performance of the methods can be limited to the data of a single user, or respective data of a subset of users, in such an environment, notwithstanding that there may be multiple users in that environment. That is, such methods may not, and need not, be performed globally in the environment.

Figure 3:
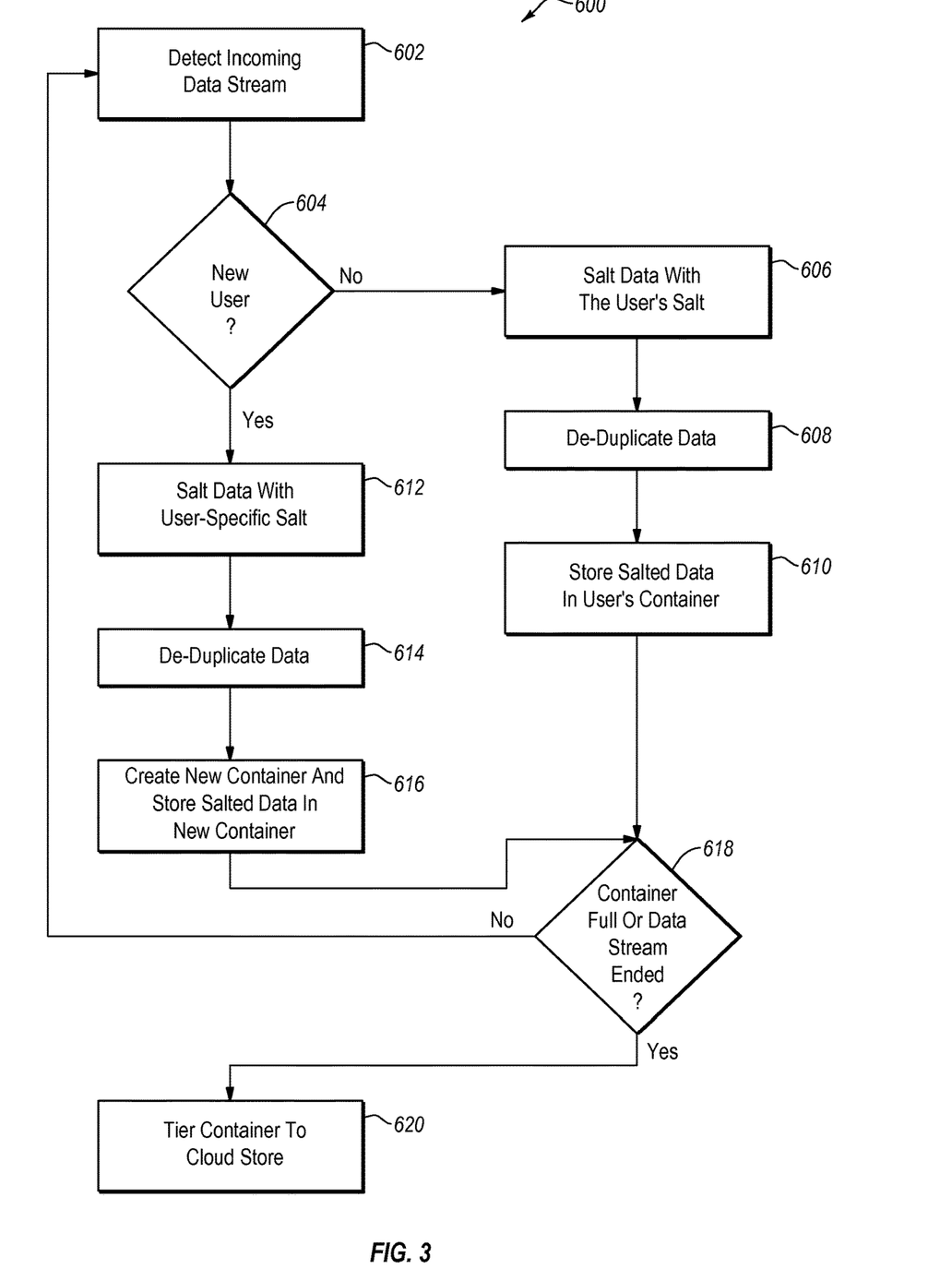
FIG. 3 discloses aspects of an example method for user-level deduplication in a shared deduplication environment.

Turning first to FIG. 3, an example of a method for user-level deduplication in a shared deduplication environment is denoted generally at 600. In such an environment, multiple users may generate data streams in connection with which deduplication is performed. In at least some embodiments, the method 600 is performed by, or at the direction of, a deduplication server.

Initially, an incoming data stream is detected 602. The data stream can include any type or types of data and may, in some instances, be a stream of data generated by a user in connection with the operation of one or more applications, for example. Next, a check is performed 604 to determine whether the incoming data stream is associated with a new, or existing, user. If the user is an existing user, the method proceeds to 606 wherein the incoming content is salted with the salt associated with the existing user. The salted data of that user is then deduplicated 608, such as by way of any of the deduplication processes disclosed herein, and the salted and de-duplicated data is then stored 610 in the container associated with the incoming data stream. As noted herein, the deduplication 608 is directed only to the data of the user with whom the incoming data stream is associated, notwithstanding that there may be multiple users operating in the same de-duplication environment as the user whose data is de-duplicated at 608.

If, on the other hand, it is determined at 604 that the incoming data stream is associated with a new user, a user-specific salt is created and associated 612 with the data in the incoming data stream. Because this user has not previously created a data stream, de-duplication may not be necessary. However, the data stream itself may require de-duplication. Thus, the salted data of the new user is then deduplicated 614, such as by way of any of the deduplication processes disclosed herein. Next, a new container can be created 616 to accept the new data stream.

It should be noted that while the creation of the new container is shown in FIG. 3 as following both de-duplication 614 and salting 612, the creation of the new container can be performed at other points during the method 600. By way of illustration, the new container can be created immediately following a determination at 604 that the incoming data stream is associated with a new user, or at any other suitable time. In any case, at some point subsequent to salting 612 and de-duplication 614, the salted and de-duplicated data is then stored 616 in the newly created container associated with the incoming data stream.

In any case, after the salted and de-duplicated data has been stored in the corresponding container, a check is performed 618 to determine whether the container is full or whether the data stream has ended. If neither condition is met, the method 600 returns to 602. On the other hand, if one or both conditions are met at 618, the method 600 proceeds to 620 where the container is tiered to a cloud store.

It should be noted that multiple instances of the method 600 can be performed at the same time, or in overlapping temporal fashion. In these examples, each instance of the method is associated with a respective data stream and with a respective user.

Figure 4:
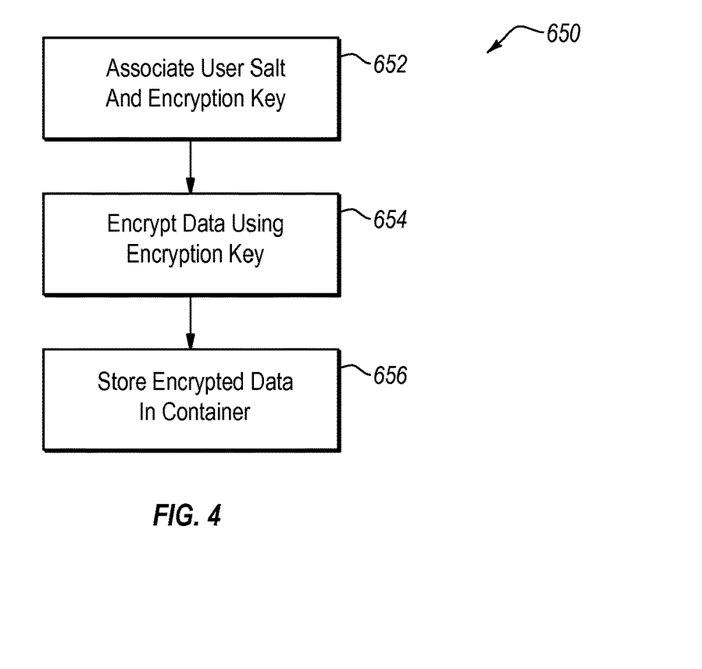
FIG. 4 discloses aspects of an example method for user-level data encryption in a shared deduplication environment.

With reference now to FIG. 4, an example of a method for user-level data encryption in a shared deduplication environment is denoted generally at 650. In such an environment, multiple users may generate data streams in connection with which deduplication is performed. In at least some embodiments, the method 650 is performed by, or at the direction of, a deduplication server. Among other things, the method 650 enables encryption of data, at a user level, within a shared deduplication environment. Thus, the data of one or more users in such an environment may be encrypted, while the data of one or more other users in that same environment may not be encrypted. As well, data streams of different respective users in the environment can be encrypted in different respective ways, depending upon considerations such as the type and sensitivity of the data involved.

The data to be encrypted may be salted and de-duplicated data and may take the form, for example, of the data that is stored in containers in connection with the performance of methods such as exemplified in FIG. 3, or the other methods disclosed herein. The user-level data encryption can be performed automatically such as according to a time schedule, or can be performed based on the occurrence or non-occurrence of one or more specified events, or can be performed ad hoc in response to a user request. In any case, the user-level data encryption and subsequent decryption can be performed by, or at the direction of, a deduplication server, although neither arrangement is necessarily required.

Turning now to the example method 650, a user salt may initially be associated 652 with an encryption key, or vice versa. The encryption key and user salt, or salts, can be associated with each other in any of a variety of ways. For example, the encryption key can be appended, or prepended, to a user salt. In at least some implementations, the encryption key is a system-wide encryption key that can be, or is, employed by all users within a shared deduplication environment. That is, the encryption key may be specific to a particular deduplication environment. Because each salt is user-specific, the combination of a user salt+encryption key is likewise user-specific, that is, that combination is specific to the same user to which the salt corresponds.

After the user salt and encryption key have been associated with each other, the salted encryption key can then be used to encrypt 654 one or more chunks or blocks of one or more objects of the user. In at least some embodiments, the chunks or blocks have not been salted prior to encryption 654. In other embodiments, the chunks or blocks have been salted prior to being encrypted 654. As well, the data that is to be encrypted may, or may not, have been deduplicated prior to encryption.

Finally, the encrypted user data can be stored 656 in a corresponding container. As noted herein, a container may be specific to a particular data stream of a particular user. Moreover, the container, or containers, can be tiered to a cloud store after the container becomes full and/or after the user data stream with which the container is associated has ended.

As exemplified by the discussion of FIG. 4, the scope of the invention embraces a variety of different user-level processes that may be performed in the context of a deduplication environment that is shared by multiple users. Any of these user-level processes may involve the use of data that has been salted and/or de-duplicated. Details concerning another example user-level process are discussed below.

Figure 5:
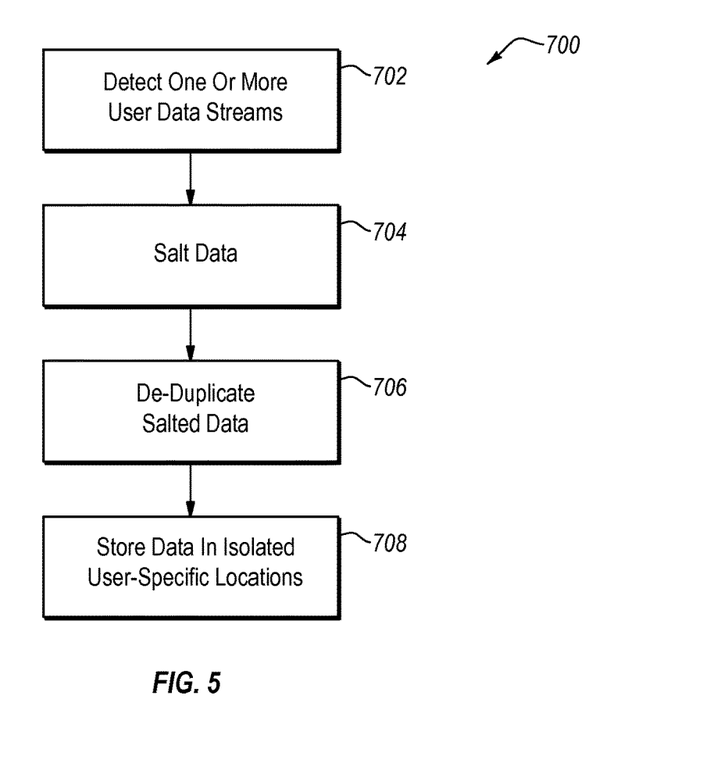
FIG. 5 discloses aspects of an example method for user-level data isolation in a shared deduplication environment.

In particular, and with reference now to FIG. 5, an example of a process for implementing user-level data isolation in a shared deduplication environment is denoted generally at 700. The method 700 can be performed in connection with one or more containers, each of which may include multiple logical block addresses (LBAs). In contrast with some other disclosed embodiments, a container or containers employed in connection with the method 700 may not be user-specific and, instead, may contain data associated with a variety of respective users, thus giving rise to the need for user-level data isolation.

Initially, one or more user data streams is detected 702, and the incoming data salted 704. This process may involve detection of one or more incoming user data streams and association of an existing salt, and/or creating and associating a new salt, with respective data streams, such as in the manner disclosed in FIG. 3 discussed above. After the data has been salted 704, a de-duplication process can be performed 706 with respect to one, some, or all of the incoming data streams. The deduplication process 706 results in the creation of one or more sets of salted and de-duplicated data, where each of the sets corresponds to a particular user.

After the incoming data of the users has been salted and de-duplicated, that data is then stored 708 at isolated user-specific locations in the container. By way of illustration, salted and deduplicated data associated with a first user can be stored at a location such as LBAx of a container, while the salted and deduplicated data associated with an 'nth' user can be stored at a location such as LBAn of the same container that includes the address LBAx where the data of the first user is stored.

Thus, even if user 1 and user 'n' each store an identical block in the same container, the use of respective storage locations LBAx and LBAn in that container for the storage of those identical user blocks ensures that the two identical blocks do not share the same persistent storage address space. That is, the respective data of user 1 and user 'n' are isolated from each other in storage, and as explained above, this isolation is enabled by the use of respective user-specific salts.

Figure 6:
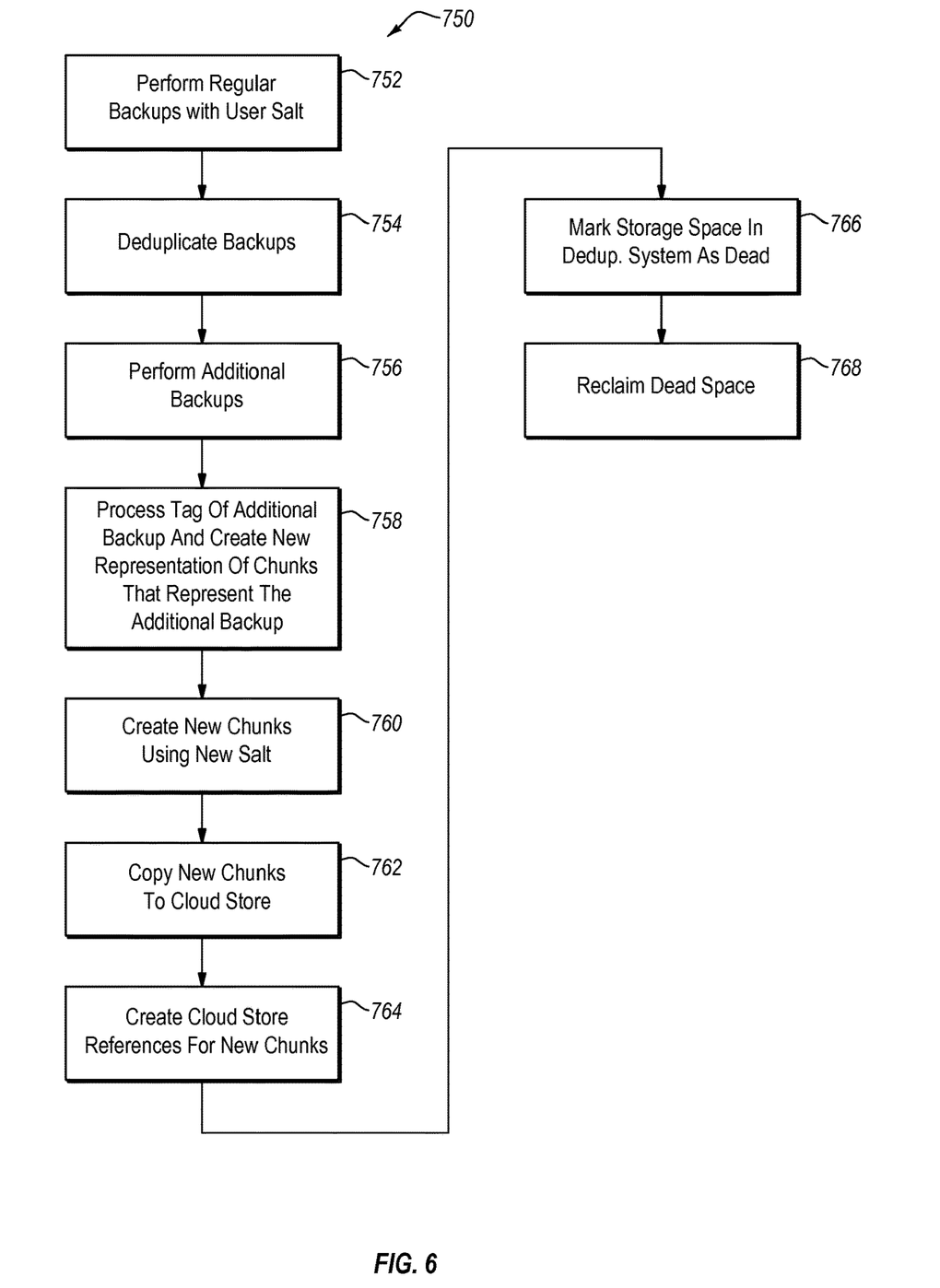
FIG. 6 discloses aspects of an example method for tiering salted deduplication domains to cloud storage, while also accounting for daily or other backups that may be occurring.
Figure 7:
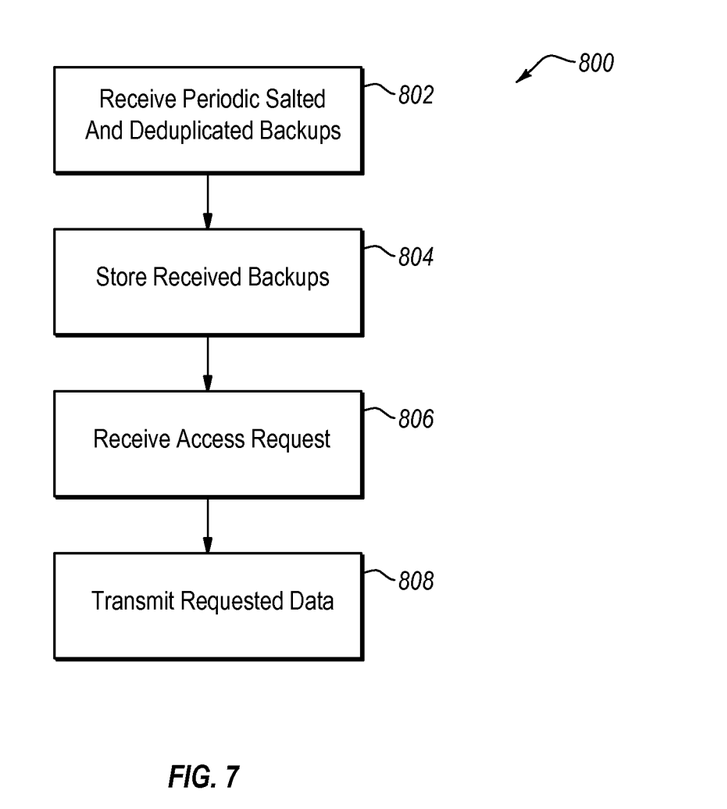
FIG. 7 discloses aspects of an example method for accessing and retrieving salted deduplicated content from a cloud store.

With reference finally to FIGS. 6 and 7, details are provided concerning a method that involves tiering salted deduplication domains to cloud storage, while also accounting for daily or other backups that may be occurring. One example of such a method is denoted generally at 750 in FIG. 6. In at least some embodiments, the entire method 750 disclosed in FIG. 6 can be performed by a deduplication system, examples of which are disclosed herein, while the method 800 of FIG. 7 can be performed by a cloud storage service operating at a cloud store.

The example method 750 includes the performance of regular backups 752, such as daily backups for example, by a backup application and associated backup client(s) to the deduplication system (see, e.g., FIG. 1). These backups can use the user salt associated with the data that is being backed up. Before, or after, the data is backed up, the data can be deduplicated 754 by the deduplication system.

In addition to performance of the regular backups 752, yet other backups can be performed 756, also by the backup application and backup client(s). For example, monthly backups can be performed to the deduplication system using the user salt, and the monthly backups can be tagged for cloud tiering and/or other processes. In some embodiments, a deduplication system scheduler processes the tag and creates a new representation 758 of the chunks representing the monthly backups by appending a new unique salt to the user salt, for example, user salt+"monthly backup 1 salt."

As well, a new set of chunks are created 760 for the object with the new salt. Next, a deduplication system tiering engine copies 762 the new set of chunks, via a translation layer, to the cloud store. As the new chunks are processed 762 into the cloud store in groups, references to the cloud store for those chunks are created 764 by the deduplication system using an efficient data structure representation. These references can be maintained in the deduplication system so that the chunks in the cloud store can be recalled in the event of an access request to the namespace object, which now represents the chunks in the cloud store. An access request against an object that has been tiered to the cloud creates a pipeline and translation layer between the deduplication system and the cloud store to support the access request.

Finally, on the deduplication side, the spaces consumed by the chunks tiered to the cloud store are marked dead 766 so space can be reclaimed by a deduplication systems garbage collection process 768.

With reference now to FIG. 7, details are provided concerning a method for handling salted content at a cloud store, one example of which is generally denoted at 800. The method 800 can begin when one or more salted and deduplicated backups are received 802 at the cloud store from a deduplication system, or backup system.

The received backups are then stored 804 in the cloud store. At some point after storage 804 of the salted deduplicated backups, an access request is received 806 by the cloud store concerning the stored data. The access request may originate at a client, or at the deduplication system. After receipt of the access request 806, the cloud store then retrieves and transmits 808 the requested data to the deduplication system, client, and/or other destination(s).

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing data, comprising:
   detecting, in a shared multi-tenant deduplication system, a data stream that is generated in part by one or more applications and is specific to a particular user and that includes one or more user objects each having one or more data chunks;
   creating a set of salted data chunks by salting data associated with the user, wherein salting data comprises associating a user-specific salt with the data chunks of the one or more user objects to form user-specific combinations of the form ((user-specific salt)+(user data chunk));
   processing the user data using the user-specific salt, wherein processing the user data using the user-specific salt comprises hashing the user data together with a combination of the user-specific salt and a system-wide encryption key; and
   reducing an amount of data to be stored in a storage medium by performing a deduplication of the set of salted data chunks, wherein deduplication comprises identifying and removing duplicate data chunks from the set of salted data chunks, and wherein deduplication is performed without reference to data chunks associated with another user.

2. The method as recited in claim 1, wherein processing the user data using the user-specific salt comprises encrypting the user data.

3. The method as recited in claim 1, further comprising creating a container and storing the deduplicated set of salted data chunks in the container, wherein the container is created in response to a determination that the particular user associated with the data stream is a new user.

4. The method as recited in claim 1, wherein the user-specific salt is either appended to the system-wide encryption key, or the system-wide encryption key is prepended to the user-specific salt.

5. The method as recited in claim 1, wherein processing the user data using the user-specific salt comprises isolating the user data from data of one or more other users in the shared multi-tenant deduplication system.

6. The method as recited in claim 5, wherein isolating the user data from data of one or more other users in the shared multi-tenant deduplication system comprises storing the user data at one or more storage addresses not used by any other user in the shared multi-tenant deduplication system.

7. The method as recited in claim 6, wherein the user data is stored in a common container with data of one or more other users in the shared multi-tenant deduplication system.

8. The method as recited in claim 7, wherein one block of the stored user data is identical to a stored block of data associated with another user.

9. A method, comprising:
   detecting, in a shared multi-tenant deduplication system, a plurality of data streams, each of which is specific to a particular user and includes one or more user objects each having one or more data chunks; and
   salting a set of data chunks that spans multiple users, wherein the data chunks are salted using two or more salts, one of which is a salt that is based on a common property that is not user-specific and is shared by the data chunks in the set of data chunks, wherein the common property of the salt is a retention period, and the two or more salts further include a user-specific salt;
   assigning a tag to a backup dataset that includes the set of salted data chunks;
   reducing an amount of data to be stored in a storage medium by performing a deduplication of the set of salted data chunks, wherein deduplication comprises identifying and removing duplicate data chunks from the set of salted data chunks; and
   based on the tag, tiering the set of salted data chunks to a cloud store.

10. The method as recited in claim 9, wherein salting the data chunks based on the common property enables preservation of locality for a set of objects associated with the salted data chunks.

11. A non-transitory storage medium having stored therein computer-executable instructions which, when executed by one or more hardware processors, perform the operations:
   detecting, in a shared multi-tenant deduplication system, a data stream that is generated in part by one or more applications and is specific to a particular user and that includes one or more user objects each having one or more data chunks;
   creating a set of salted data chunks by salting data associated with the user, wherein salting data comprises associating a user-specific salt with the data chunks of the one or more user objects to form user-specific combinations of the form ((user-specific salt)+(user data chunk));
   processing the user data using the user-specific salt, wherein processing the user data using the user-specific salt comprises hashing the user data together with a combination of the user-specific salt and a system-wide encryption key; and
   reducing an amount of data to be stored in a storage medium by performing a deduplication of the set of salted data chunks, wherein deduplication comprises identifying and removing duplicate data chunks from the set of salted data chunks, and wherein deduplication is performed without reference to data chunks associated with another user.

12. The non-transitory storage medium as recited in claim 11, wherein processing the user data using the user-specific salt comprises encrypting the user data.

13. The non-transitory storage medium as recited in claim 11, wherein the operations further comprise creating a container and storing the deduplicated set of salted data chunks in the container, wherein the container is created in response to a determination that the particular user associated with the data stream is a new user.

14. The non-transitory storage medium as recited in claim 11, wherein the user-specific salt is either appended to the system-wide encryption key, or the system-wide encryption key is prepended to the user-specific salt.

15. The non-transitory storage medium as recited in claim 11, wherein processing the user data using the user-specific salt comprises isolating the user data from data of one or more other users in the shared multi-tenant deduplication system.

16. The non-transitory storage medium as recited in claim 15, wherein isolating the user data from data of one or more other users in the shared multi-tenant deduplication system comprises storing the user data at one or more storage addresses not used by any other user in the shared multi-tenant deduplication system.

17. The non-transitory storage medium as recited in claim 16, wherein the user data is stored in a common container with data of one or more other users in the shared multi-tenant deduplication system.

18. The non-transitory storage medium as recited in claim 17, wherein one block of the stored user data is identical to a stored block of data associated with another user.

19. A non-transitory storage medium having stored therein computer-executable instructions which, when executed by one or more hardware processors, perform the operations:
   detecting, in a shared multi-tenant deduplication system, a plurality of data streams, each of which is specific to a particular user and includes one or more user objects each having one or more data chunks; and
   salting a set of data chunks that spans multiple users, wherein the data chunks are salted using two or more salts, one of which is a salt that is based on a common property that is not user-specific and is shared by the data chunks in the set of data chunks, wherein the common property of the salt is a retention period, and the two or more salts further include a user-specific salt;
   assigning a tag to a backup dataset that includes the set of salted data chunks;
   reducing an amount of data to be stored in a storage medium by performing a deduplication of the set of salted data chunks, wherein deduplication comprises identifying and removing duplicate data chunks from the set of salted data chunks; and
   based on the tag, tiering the set of salted data chunks to a cloud store.

20. The non-transitory storage medium as recited in claim 19, wherein salting the data chunks based on the common property enables preservation of locality for a set of objects associated with the salted data chunks.

* * * * *